US012615564B2

(12) United States Patent　(10) Patent No.:　US 12,615,564 B2
Hong　(45) Date of Patent:　Apr. 28, 2026

(54) HANDLING METHOD AND HANDLING DEVICE FOR A MULTI CARD PROBLEM, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 289 days.

(21) Appl. No.: 18/282,907

(22) PCT Filed: Mar. 19, 2021

(86) PCT No.: PCT/CN2021/081924
§ 371 (c)(1),
(2) Date: Sep. 19, 2023

(87) PCT Pub. No.: WO2022/193325
PCT Pub. Date: Sep. 22, 2022

(65) Prior Publication Data
US 2024/0163748 A1　May 16, 2024

(51) Int. Cl.
*H04W 36/00*　(2009.01)
*H04W 36/08*　(2009.01)
*H04W 68/02*　(2009.01)
*H04W 88/06*　(2009.01)

(52) U.S. Cl.
CPC .............. *H04W 36/008355* (2023.05); *H04W 36/0072* (2013.01); *H04W 36/08* (2013.01); *H04W 68/02* (2013.01); *H04W 88/06* (2013.01)

(58) Field of Classification Search
CPC ......... H04W 88/06; H04W 36/008355; H04W 36/0072; H04W 36/08; H04W 60/005; H04W 68/02; H04W 36/144; H04W 36/0079
See application file for complete search history.

(56) References Cited

U.S. PATENT DOCUMENTS

2014/0248877 A1* 9/2014 Lee ..................... H04W 36/302
455/436
2015/0281926 A1 10/2015 Liu et al.
2016/0286449 A1 9/2016 Choi et al.
(Continued)

FOREIGN PATENT DOCUMENTS

CN　103636261 A　3/2014
CN　103813357 A　5/2014
(Continued)

OTHER PUBLICATIONS

ISA State Intellectual Property Office of the People's Republic of China, International Search Report Issued in Application No. PCT/CN2021/081924, Dec. 14, 2021, WIPO, 4 pages.
(Continued)

*Primary Examiner* — Allahyar Kasraian
(74) *Attorney, Agent, or Firm* — Volpe Koenig

(57)　　ABSTRACT
A handling method for a multi-card problem includes: determining that a multi-card terminal needs to perform cell handover, sending a handover request signaling to a target base station to which the multi-card terminal is to hand over, where the handover request signaling includes a multi-card problem in the multi-card terminal.

19 Claims, 7 Drawing Sheets

(56) References Cited

U.S. PATENT DOCUMENTS

| | | | |
|---|---|---|---|
| 2020/0374942 A1 | 11/2020 | Sivavakeesar et al. | |
| 2023/0026710 A1* | 1/2023 | Wang ................ | H04W 36/0005 |
| 2024/0107409 A1* | 3/2024 | Da Silva ........... | H04W 36/0033 |

FOREIGN PATENT DOCUMENTS

| | | | |
|---|---|---|---|
| CN | 103906255 A | 7/2014 | |
| CN | 105210416 A | 12/2015 | |
| CN | 110463249 A | 11/2019 | |
| CN | 110495208 A | 11/2019 | |
| CN | 112469032 A | 3/2021 | |
| WO | 2017/136078 A1 | 8/2017 | |
| WO | 2021043274 A1 | 3/2021 | |

OTHER PUBLICATIONS

Apple Inc,"Methods for MUSIM Network Switching", R2-21008503GPP TSG-RAN WG2 Meeting #113e, Electronic Jan. 25, 2021 to Feb. 5, 2021, 8 pages. , Vivo, "[AT113-e][242][NR][Multi-SIM] NAS vs. RRC signalling for paging collision and network switching (vivo)", R2-2101981, 3GPP TSG-RAN WG2 Meeting #113-e, Online, Jan. 25-Feb. 5, 2021, 25 pages.

ISA State Intellectual Property Office of the People's Republic of China, Written Opinion of the International Searching Authority Issued in Application No. PCT/CN2021/081924, Dec. 14, 2021, WIPO, 7 pages.

State Intellectual Property Office of the People's Republic of China, Office Action and Search Report Issued in Application No. 2021800005802, Feb. 25, 2025, 19 pages. (Submitted with Machine Translation).

Intel, Sony, OPPO, InterDigital, "Solution for Paging Reception with PO collision avoidance", S2-1911942, SA WG2 Meeting #S2-136, Nov. 18-22, 2019, Reno, NV, US , 4pages.

* cited by examiner

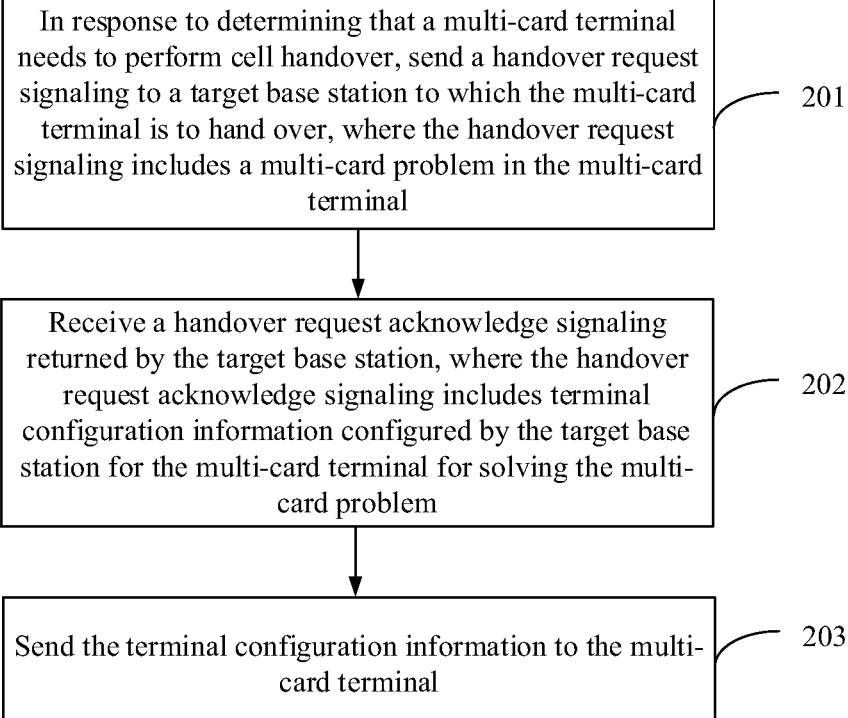

In response to determining that a multi-card terminal needs to perform cell handover, send a handover request signaling to a target base station to which the multi-card terminal is to hand over, where the handover request signaling includes a multi-card problem in the multi-card terminal          101

FIG. 1

In response to determining that a multi-card terminal needs to perform cell handover, send a handover request signaling to a target base station to which the multi-card terminal is to hand over, where the handover request signaling includes a multi-card problem in the multi-card terminal          201

Receive a handover request acknowledge signaling returned by the target base station, where the handover request acknowledge signaling includes terminal configuration information configured by the target base station for the multi-card terminal for solving the multi-card problem          202

Send the terminal configuration information to the multi-card terminal          203

FIG. 2

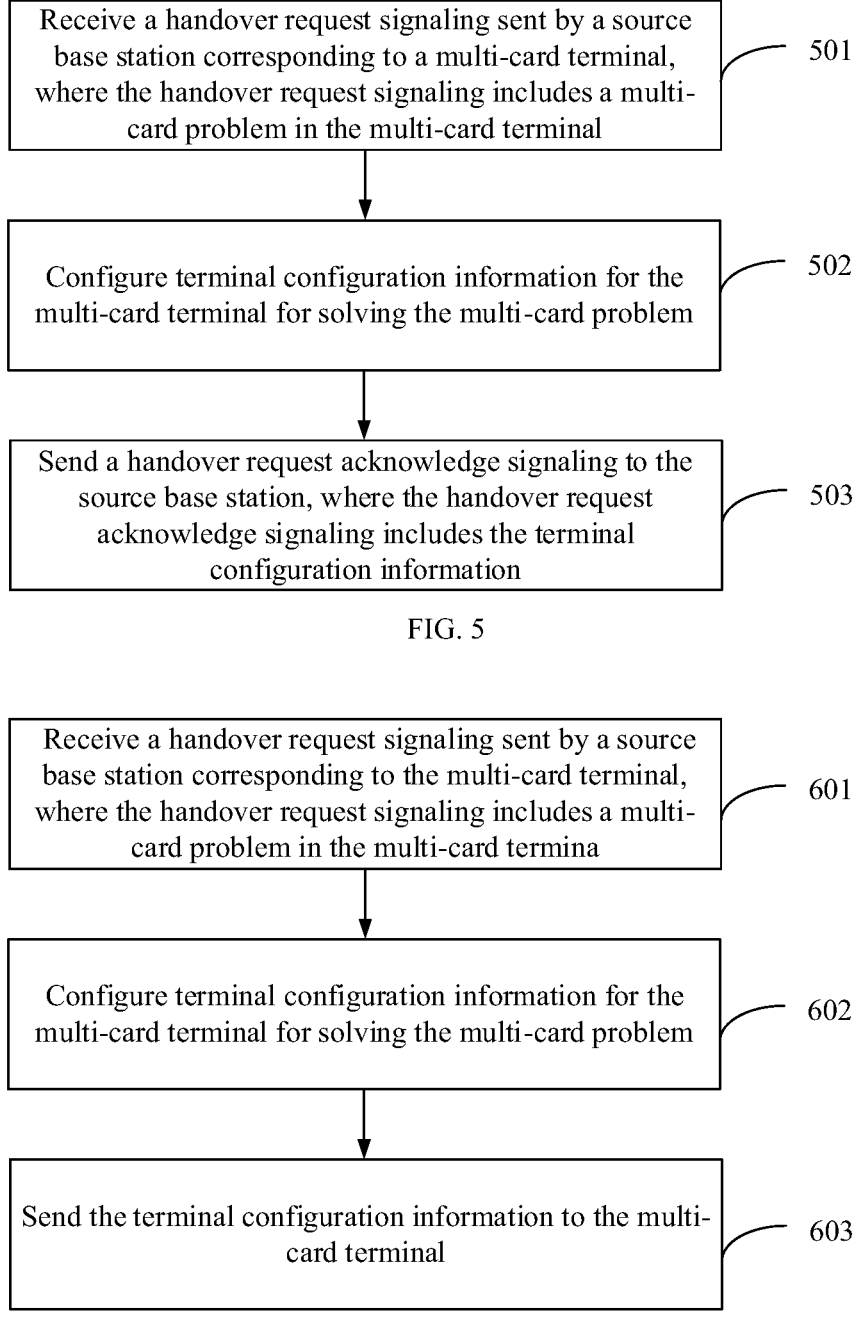

Receive a handover request signaling sent by a source base station corresponding to a multi-card terminal, where the handover request signaling includes a multi-card problem in the multi-card terminal — 501

Configure terminal configuration information for the multi-card terminal for solving the multi-card problem — 502

Send a handover request acknowledge signaling to the source base station, where the handover request acknowledge signaling includes the terminal configuration information — 503

FIG. 5

Receive a handover request signaling sent by a source base station corresponding to the multi-card terminal, where the handover request signaling includes a multi-card problem in the multi-card termina — 601

Configure terminal configuration information for the multi-card terminal for solving the multi-card problem — 602

Send the terminal configuration information to the multi-card terminal — 603

FIG. 6

Based on received terminal configuration information, solve a multi-card problem in the multi-card terminal during or after cell handover ⟋— 701

HANDLING METHOD AND HANDLING DEVICE FOR A MULTI CARD PROBLEM, AND STORAGE MEDIUM

CROSS REFERENCE TO RELATED APPLICATIONS

This application is a National Phase of International Application No. PCT/CN2021/081924, filed on Mar. 19, 2021, the entire contents of which are incorporated herein by reference in their entireties.

TECHNICAL FIELD

The present disclosure relates to the field of communication technologies, and in particular to a handling method and a handling device for a multi-card problem, and a storage medium.

BACKGROUND

With the development of wireless communication technology, there are more and more multi-card terminals.

Currently, a handling method for a multi-card terminal is mainly realized based on various terminal manufacturers, and there is no unified standard to provide for them. This leads to many different behaviors and handling methods of terminals, such as dual-card single-standby, dual-card dual-standby single-pass, dual-card dual-standby dual-pass, and the like. Further, different behaviors and handling methods of terminals may lead to multiple multi-card problems in the multi-card terminal.

SUMMARY

Embodiments of the present disclosure provide to a handling method and a handling device for a multi-card problem, and a storage medium.

According to a first aspect of embodiments of the present disclosure, there is provided a handling method for a multi-card problem, performed by a source base station, and including: determining that a multi-card terminal needs to perform cell handover, sending a handover request signaling to a target base station to which the multi-card terminal is to hand over, where the handover request signaling includes a multi-card problem in the multi-card terminal.

According to a second aspect of embodiments of the present disclosure, there is provided a handling method for a multi-card problem, performed by a target base station, and including: receiving a handover request signaling sent by a source base station corresponding to a multi-card terminal, where the handover request signaling includes a multi-card problem in the multi-card terminal; configuring terminal configuration information for the multi-card terminal for solving the multi-card problem; and sending the terminal configuration information.

According to a third aspect of embodiments of the present disclosure, there is provided a handling method for a multi-card problem, performed by a multi-card terminal, and including: solving, based on received terminal configuration information, a multi-card problem in the multi-card terminal during or after cell handover, where the terminal configuration information is configuration information configured for the multi-card terminal for solving the multi-card problem by a target base station to which the multi-card terminal is to hand over.

According to a fourth aspect of embodiments of the present disclosure, there is provided a non-transitory computer-readable storage medium, storing computer programs thereon, where the computer programs, when executed by a processor, cause the processor to perform the method of the first aspect or second aspect.

According to a fifth aspect of embodiments of the present disclosure, there is provided a non-transitory computer-readable storage medium storing computer programs thereon, where the computer programs, when executed by a processor, cause the processor to perform the method of the third aspect.

According to a sixth aspect of embodiments of the present disclosure, there is provided a handling device for a multi-card problem, including: a processor; and a memory storing instructions executable by the processor, where the processor is configured to perform the method of the first aspect or second aspect.

According to a seventh aspect of embodiments of the present disclosure, there is provided a handling device for a multi-card problem, including: a processor; and a memory storing instructions executable by the processor, where the processor is configured to perform the method of the third aspect.

It is to be understood that the above general descriptions and subsequent detailed descriptions are merely illustrative and explanatory rather than limiting of the present disclosure.

BRIEF DESCRIPTION OF THE DRAWINGS

The accompanying drawings, which are incorporated in and constitute a part of the present description, illustrate embodiments consistent with the present disclosure and serve to explain the principles of the present disclosure together with the description.

FIG. 1 is a flowchart illustrating a handling method for a multi-card problem according to an exemplary embodiment of the present disclosure.

FIG. 2 is a flowchart illustrating a handling method for a multi-card problem according to another exemplary embodiment of the present disclosure.

FIG. 5 is a flowchart illustrating a handling method for a multi-card problem according to still another exemplary embodiment of the present disclosure.

FIG. 6 is a flowchart illustrating a handling method for a multi-card problem according to still another exemplary embodiment of the present disclosure.

DETAILED DESCRIPTION OF THE EMBODIMENTS

Figure 3:
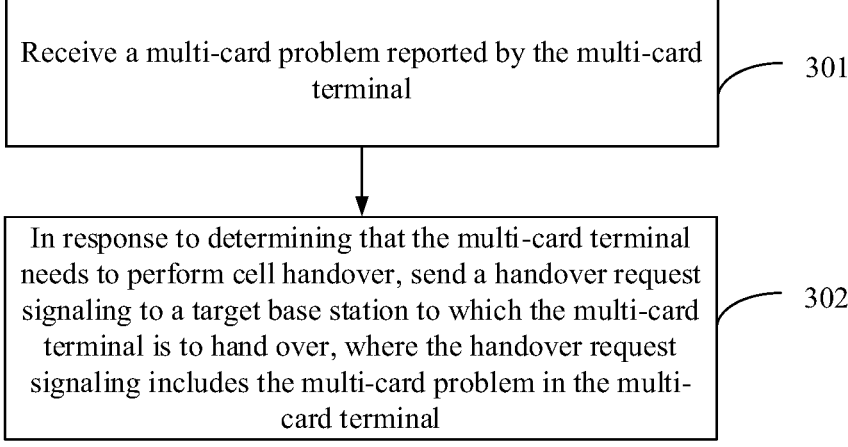
FIG. 3 is a flowchart illustrating a handling method for a multi-card problem according to yet another exemplary embodiment of the present disclosure.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terms used in the present disclosure are for the purpose of describing particular examples only, and are not intended to limit the present disclosure. Terms determined by "a", "the", and "the" in their singular forms in the present disclosure and the appended claims are also intended to include plurality, unless clearly indicated otherwise in the context. It should also be understood that the term "and/or" as used herein refers to and includes any and all possible combinations of one or more of the associated listed items.

It is to be understood that, although the terms "first," "second," "third," and the like may be used in the present disclosure to describe various information, such information should not be limited to these terms. These terms are only used to distinguish one category of information from another. For example, without departing from the scope of the present disclosure, first information may be referred to as second information; and similarly, the second information may also be referred to as the first information. Depending on the context, the term "if" as used herein may be interpreted as "when," "upon," or "in response to determining."

In embodiments of the present disclosure, the multi-card terminal may have, but is not limited to, the following multi-card problems.

Problem 1, when the multi-card terminal communicates with the first system via one of the SIM cards, the multi-card terminal needs to maintain a timed detection of the second system, including, but not limited to, listening for paging messages, performing system measurements, reading system messages, and the like, which may affect the communication performance of the first system.

Problem 2, the paging timing is calculated based on the terminal identification, and since the multi-card terminal has multiple SIM cards, the paging timing corresponding to different SIM cards may be the same, which may cause systematic paging collisions.

Problem 3, when the multi-card terminal communicates with the first system via one of the SIM cards, and the other of the SIM cards listens to a paging message from the second system, the multi-card terminal needs to decide whether to make a paging response to the paging, and currently, whether to make a paging response is determined based on rules configured by the user.

Problem 4, when the multi-card terminal is determined to respond to the paging message from the second system, it needs to stop the current service being carried out in the first system. If there is a lack of a pending mechanism for the current service, the multi-card terminal will automatically disconnect from the radio resource control (RRC) connection with the first system and leave the first system. After the multi-card terminal leaves the first system, the first system will still keep paging the multi-card terminal, which leads to the waste of paging resources.

Problem 5, when the terminal reads the paging or performs the system measurement in the second system, a short interval in the first system is caused, the time duration of which is generally around 20 ms (millisecond), but for the first system, it is equivalent to experiencing shadow fading (in mobile communications, the shadow effect caused by obstacles decreases the received signal strength, but the median field strength changes slowly with geographical changes, also known as slow fading). Since a short interval occurs once per paging cycle, it may affect the power control and link adaptive algorithms of the network, which in turn causes a waste of resources in the first system.

Problem 6, when the terminal is determined to hand over to a cell of the second system, the terminal needs to read the system information in the second system. Thus, a long interval in the first system is caused, the time duration of which is generally around 1s (second), and the first system may consider the long interval as an error situation. In the related art, neither the base station nor the terminal can handle the situation.

Problem 7, when the terminal performs a tracking area update (TAU) in the second system, a longer interval in the first system may be caused. The time duration of the longer interval may reach several seconds, thus causing a greater impact on the first system.

In order to solve the multi-card problem in the multi-card terminal during the cell handover process or after the cell handover is completed, the present disclosure provides the following handling solution for a multi-card problem.

A handling method for a multi-card problem provided by the present disclosure is first described herein from the source base station side.

Embodiments of the present disclosure provide a handling method for a multi-card problem. FIG. 1 is a flowchart illustrating the handling method for a multi-card problem according to an exemplary embodiment of the present disclosure. As shown in FIG. 1, the method can be applied to a source base station, which is a base station to which a multi-card terminal is currently connected, or in which the multi-card terminal is currently stationed, and the method may include the following step 101.

At step 101, in response to determining that a multi-card terminal needs to perform cell handover, a handover request signaling is sent to a target base station to which the multi-card terminal is to hand over. Where the handover request signaling includes a multi-card problem in the multi-card terminal.

In the embodiments of the present disclosure, in response to determining that the multi-card terminal needs to perform cell handover, the source base station may send the handover request signaling to the target base station to which the multi-card terminal is to hand over. The handover request signaling includes the multi-card problem existing in the multi-card terminal. In the embodiments of the present disclosure, the multi-card problem in the multi-card terminal refers to a problem which occurs in the multi-card terminal and affects at least one of the systems when the multi-card terminal handles the services of different network systems corresponding to multiple SIM cards, and the multi-card problem includes, but is not limited to, at least one of the above-mentioned the problems 1 to 7.

In the above embodiment, the source base station corresponding to the multi-card terminal may send the handover request signaling to the target base station to which the multi-card terminal is to hand over. And the handover request signaling includes the multi-card problem existing in the multi-card terminal. The target base station may configure terminal configuration information for the multi-card terminal for solving the multi-card problem, and send the terminal configuration information, such that the multi-card problem can be solved for the multi-card terminal during the cell handover process or after the cell handover is completed.

In a possible implementation, the source base station may send the handover request signaling, including the multi-card problem to the target base station via an interface between base stations. In an embodiment, the interface between base stations includes, but is not limited to, an X2 interface or an Xn interface.

In a possible implementation, the source base station may add a new information unit to the handover request signaling to send the multi-card problem. In an embodiment, the source base station adds a target information unit for indicating the multi-card problem to the handover request signaling, and sends a handover request signaling including the target information unit to the target base station.

In another possible implementation, the source base station may send the multi-card problem via a handover preparation information of the handover request signaling. In an embodiment, the source base station sends a handover request signaling including the handover preparation information to the target base station after adding the multi-card problem to the handover preparation information.

In the above embodiments, the source base station may send the multi-card problem in the multi-card terminal to the target base station via the handover request signaling, so that the target base station may configure the terminal configuration information for the multi-card terminal that may solve the multi-card problem. The purpose of solving the multi-card problem for the multi-card terminal during the cell handover or after the cell handover is achieved.

In some embodiments, the handover request signaling may further include auxiliary information that is configured to assist the target base station in solving the multi-card problem.

In the embodiments of the present disclosure, the auxiliary information may be determined by the multi-card terminal based on its own multi-card problem, or may be determined by the source base station based on the multi-card problem reported by the multi-card terminal. The auxiliary information may include information related to a solution method that may solve the multi-card problem. The information includes, but is not limited to, at least one of: a random access preamble code when the multi-card terminal initiates a random access, a wireless network temporary identification of the SIM card with paging collisions in the multi-card terminal, or an expected time duration to leave the first system configured for the multi-card terminal by the network side.

For example, the multi-card terminal has the above-mentioned multi-card problem 2 during the cell handover, i.e., a collision occurs in the paging timing of multiple SIM cards. The auxiliary information may be a wireless network temporary identification of the SIM card, in which the collision of paging occurs, of the multi-card terminal recommended to the target base station.

For example, the multi-card terminal has the above-mentioned multi-card problem, i.e., the problem of lacking a corresponding pending mechanism, during the cell handover. The auxiliary information may include, but is not limited to, recommending the target base station to configure the time duration information to leave the first system for the multi-card terminal.

The above is only an exemplary illustration, and any auxiliary information that may assist the target base station in solving the multi-card problem will fall within the scope of the present disclosure.

In one possible implementation, the source base station, after adding the auxiliary information to the target information unit along with the multi-card problem, sends a handover request signaling including the target information unit to the target base station.

In another possible implementation, the source base station, after adding the auxiliary information to the handover preparation information along with the multi-card problem, sends the handover request signaling, including the handover preparation information, to the target base station.

In the above embodiments, the source base station may include the auxiliary information in the handover request signaling to assist the target base station in solving the multi-card problem for the multi-card terminal. The purpose of solving the multi-card problem for the multi-card terminal during the cell handover or after the cell handover is achieved, and the availability is high.

In some embodiments, FIG. 2 is a flowchart illustrating a handling method for a multi-card problem according to an exemplary embodiment of the present disclosure, as shown in FIG. 2. The method can be applied to a source base station to which the multi-card terminal is currently connected, or in which the multi-card terminal is currently stationed. The method, as shown in FIG. 2, may include the following steps 201 to 203.

At step 201, in response to determining that a multi-card terminal needs to perform cell handover, a handover request signaling is sent to a target base station to which the multi-card terminal is to hand over, where the handover request signaling includes a multi-card problem in the multi-card terminal.

After receiving the information on the multi-card problem, the target base station may solve the multi-card problem for the terminal if the target base station has the capability to solve the multi-card problem.

At step 202, a handover request acknowledgment signaling returned by the target base station is received. Where the handover request acknowledgment signaling includes terminal configuration information configured by the target base station for the multi-card terminal, for solving the multi-card problem.

The target base station may inform the source base station of the configuration for a multi-card problem in multi-card terminals via the handover request acknowledgment signaling.

The target base station may also inform the multi-card terminal of the configuration for the multi-card problem via an RRC reconfiguration signaling or an RRC connection reconfiguration signaling after the multi-card terminal completes the handover.

In the embodiments of the present disclosure, the source base station may control the multi-card terminal to perform cell handover based on the handover request acknowledgment signaling.

At step 203, the terminal configuration information is sent to the multi-card terminal.

In the above embodiment, the source base station may send the terminal configuration information to the multi-card terminal, and the multi-card terminal may perform the cell handover in accordance with the terminal configuration information, or interact with the network side based on the terminal configuration information after the cell handover, so as to solve the multi-card problem in the multi-card terminal during the cell handover or after the cell handover.

In a possible implementation, the source base station may send a radio resource control reconfiguration signaling, including the terminal configuration information, to the multi-card terminal.

In another possible implementation, the source station may send a handover command including the terminal configuration information to the multi-card terminal. The handover command is configured to instruct the multi-card terminal to hand over to a cell corresponding to the target base station.

In some embodiments, the source base station receives a handover request acknowledgment signaling returned by the target base station that does not include the terminal configuration information, and the source base station may control the multi-card terminal to perform the cell handover based on the handover request acknowledgment signaling. Subsequently, the terminal configuration information may be sent to the multi-card terminal by the target base station after the target base station determines that the multi-card terminal hands over to the cell corresponding to the target base station.

In the above embodiments, the purpose of solving the multi-card problem for the multi-card terminal after the cell handover is achieved, and the usability is high.

In some embodiments, FIG. 3 is a flowchart illustrating a handling method for a multi-card problem according to an exemplary embodiment of the present disclosure, as shown in FIG. 3. The method can be applied to a source base station, which is a base station to which a multi-card terminal is currently connected, or in which the multi-card terminal is currently stationed. The method as shown in FIG. 3 may include the following steps 301 to 302.

At step 301, a multi-card problem reported by the multi-card terminal is received.

At step 302, in response to determining that the multi-card terminal needs to perform cell handover, a handover request signaling is sent to a target base station to which the multi-card terminal is to hand over. Where the handover request signaling includes the multi-card problem in the multi-card terminal.

In the above embodiments, the source base station may receive the multi-card problem reported by the multi-card terminal. In the case of needing to hand over to the target base station, the handover request signaling, including the multi-card problem, is sent to the target base station. The method is simple to implement and has high availability.

The handling method for a multi-card problem provided by the present disclosure is described below from the target base station side.

Figure 4:
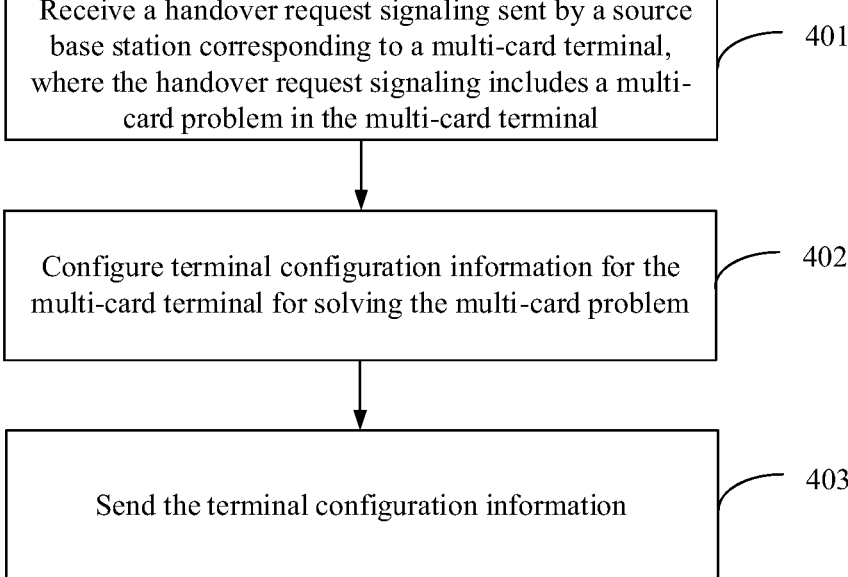
FIG. 4 is a flowchart illustrating a handling method for a multi-card problem according to still another exemplary embodiment of the present disclosure.

The embodiments of the present disclosure provide a handling method for a multi-card problem. FIG. 4 is a flowchart illustrating a handling method for a multi-card problem according to an exemplary embodiment of the present disclosure. As shown in FIG. 4, the method can be applied to a target base station, which is a base station to which the multi-card terminal is to hand over, and the method may include the following steps 401 to 403.

At step 401, a handover request signaling sent by a source base station corresponding to a multi-card terminal is received, where the handover request signaling includes a multi-card problem in the multi-card terminal.

At step 402, terminal configuration information is configured for the multi-card terminal to solve the multi-card problem.

In the embodiments of the present disclosure, the target base station may configure the terminal configuration information for the multi-card terminal based on the multi-card problem included in the handover request signaling. In a possible implementation, the target base station configures the terminal configuration information after determining that it has the capability to solve the multi-card problem in the multi-card terminal.

At step 403, the terminal configuration information is sent.

In the above embodiments, the target base station may configure the terminal configuration information for solving the multi-card problem for the multi-card terminal based on the multi-card problem included in the handover request signaling sent by the source base station, and send the terminal configuration information. Thus, solving the multi-card problem for the multi-card terminal during the cell handover or after the cell handover is completed.

In some embodiments, the handover request signaling includes auxiliary information, and the auxiliary information is configured to assist the target base station in solving the multi-card problem.

The target base station may configure the terminal configuration information for the multi-card terminal to solve the multi-card problem based on the multi-card problem included in the handover request signaling, and the auxiliary information.

In the above embodiments, the target base station may solve the multi-card problem for the multi-card terminal in combination with the auxiliary information included in the handover request signaling. The method is simple to implement and has high availability.

In some embodiments, FIG. 5 is a flowchart illustrating a handling method for a multi-card problem according to an exemplary embodiment of the present disclosure, as shown in FIG. 5. The method can be applied to a target base station, which is a base station to which the multi-card terminal is to hand over, and the method, as shown in FIG. 5, may include the following steps 501 to 503.

At step 501, a handover request signaling sent by a source base station corresponding to a multi-card terminal is received, where the handover request signaling includes a multi-card problem in the multi-card terminal.

At step 502, terminal configuration information is configured for the multi-card terminal to solve the multi-card problem.

At step 503, a handover request acknowledgment signaling is sent to the source base station, where the handover request acknowledgment signaling includes the terminal configuration information.

In the above embodiments, the target base station may send the terminal configuration information to the source base station by the handover request acknowledge signaling, so that the source base station may send the terminal configuration information to the multi-card terminal. Thus, solving the multi-card problem for the multi-card terminal during the cell handover or after the cell handover is completed.

In some embodiments, FIG. 6 is a flowchart illustrating a handling method for a multi-card problem according to an exemplary embodiment of the present disclosure. As shown in FIG. 6, the method can be applied to a target base station, which is a base station to which the multi-card terminal is to hand over. The method, as shown in FIG. 6, may include the following steps 601 to 603.

At step 601, a handover request signaling sent by a source base station corresponding to the multi-card terminal is received, where the handover request signaling includes a multi-card problem in the multi-card terminal.

At step 602, terminal configuration information is configured for the multi-card terminal to solve the multi-card problem.

At step 603, the terminal configuration information is sent to the multi-card terminal.

In a possible implementation, the target base station may send a radio resource control reconfiguration signaling, including the terminal configuration information to the multi-card terminal.

In another possible implementation, the target base station may send a wireless resource control connection reconfiguration signaling, including the terminal configuration information to the multi-card terminal.

The above is only an exemplary illustration, and the target base station may also send the terminal configuration information to the multi-card terminal via other signaling or messages, which is not limited by the present disclosure.

In the above embodiment, the target base station may send the terminal configuration information to the multi-card terminal after determining that the multi-card terminal has completed the cell handover and handed over to the cell corresponding to the target base station, so as to solve the multi-card problem for the multi-card terminal after the cell handover is completed.

The handling method for a multi-card problem provided by the present disclosure is described below from the multi-card terminal side.

Figures 7, 8:
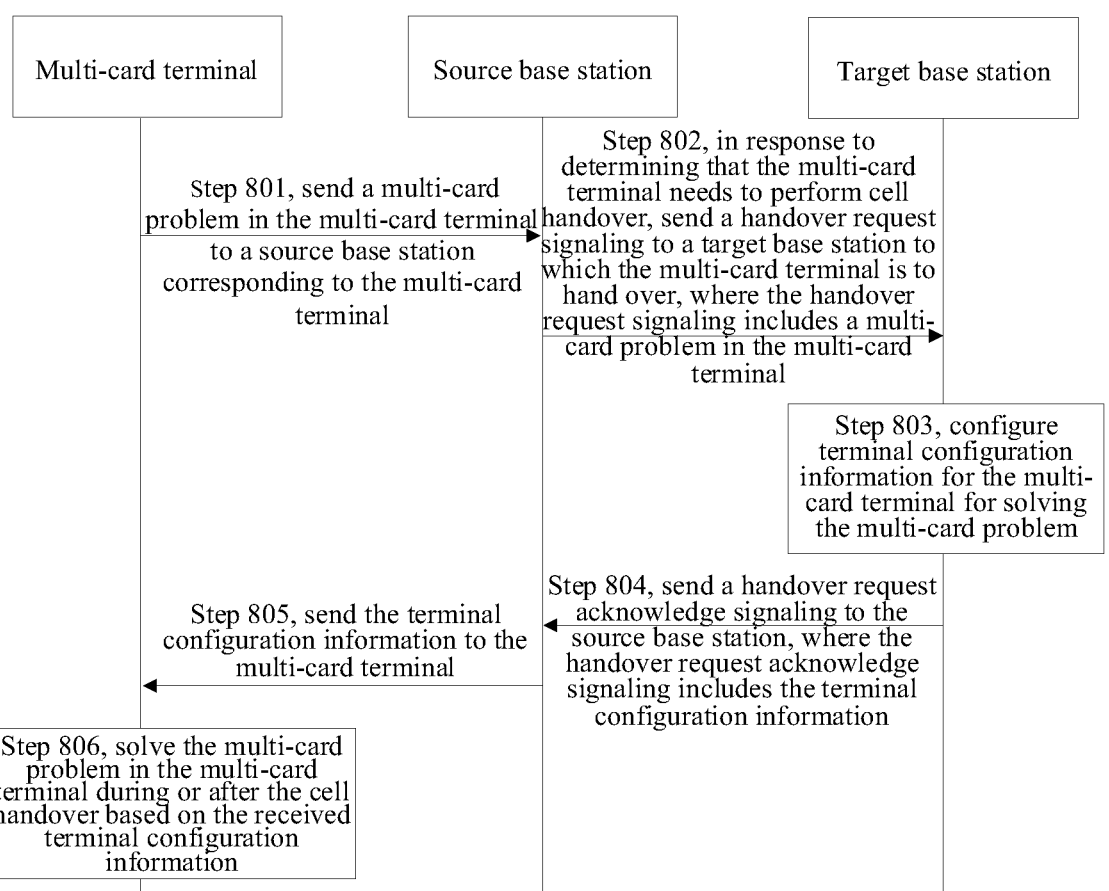
FIG. 7 is a flowchart illustrating a handling method for a multi-card problem according to still another exemplary embodiment of the present disclosure.
FIG. 8 is a flowchart illustrating a handling method for a multi-card problem according to still another exemplary embodiment of the present disclosure.

An embodiment of the present disclosure provides a handling method for a multi-card problem. FIG. 7 is a flowchart illustrating a handling method for a multi-card problem according to an exemplary embodiment of the present disclosure. As shown in FIG. 7, the method can be applied to a multi-card terminal, and the method may include the following step 701.

At step 701, based on received terminal configuration information, a multi-card problem in the multi-card terminal is solved during or after cell handover.

In embodiments of the present disclosure, the terminal configuration information is configuration information configured for the multi-card terminal by a target base station to which the multi-card terminal is to hand over, so as to solve the multi-card problem.

In the embodiments of the present disclosure, after the multi-card terminal receives the terminal configuration information sent by the source base station, the multi-card terminal may perform cell handover based on the terminal configuration information, or interact with the network side based on the terminal configuration information after the cell handover is completed, so as to solve the multi-card problem.

For example, the terminal configuration information includes a random access preamble code, and the multi-card terminal may access the target base station based on the random access preamble code indicated by the terminal configuration information in the process of performing the cell handover, so as to solve the multi-card problem in the multi-card terminal.

For example, the terminal configuration information includes a wireless network temporary identification of a SIM card in which a paging collision occurs in the multi-card terminal. The multi-card terminal may determine the paging timing of the corresponding SIM card based on the wireless network temporary identification indicated by the terminal configuration information after the cell handover is completed. This solves the multi-card problem of paging collision in the multi-card terminal.

For example, the terminal configuration information includes time duration information that the multi-card terminal may leave the first system, and the multi-card terminal may, after completing the cell handover, leave the first system, hand over to the second system to receive the paging message, and return to the first system when the time duration of leaving the first system reaches the time duration indicated by the terminal configuration information. The multi-card problem of wasting paging resources in the multi-card terminal is solved.

In the included embodiments, when the source base station corresponding to the multi-card terminal determines that the multi-card terminal needs to perform cell handover, the source base station may send the handover request signaling to the target base station to which the multi-card terminal is to hand over. The handover request signaling includes the multi-card problem in the multi-card terminal. The target base station may configure the terminal configuration information for the multi-card terminal to solve the multi-card problem, and send the terminal configuration information. The present disclosure may solve the multi-card problem for the multi-card terminal during or after the cell handover.

In a possible implementation, the multi-card terminal receives the terminal configuration information sent by the source base station. The multi-card terminal may solve the multi-card problem during or after the cell handover based on the terminal configuration information.

In another possible implementation, the multi-card terminal receives the terminal configuration information sent by the target base station after the multi-card terminal hands over to the cell corresponding to the target base station. Thus, the multi-card problem can be solved after the cell handover is completed.

In the above embodiments, either the source base station or the target base station may send the terminal configuration information configured by the target base station for the multi-card terminal to the multi-card terminal, and the multi-card terminal, based on the terminal configuration information, solves the multi-card problem during or after the cell handover, with a high usability.

In some embodiments, the multi-card terminal needs to report the multi-card problem in the multi-card terminal to the source base station before receiving the terminal configuration information sent by the source base station or the target base station.

In a possible implementation, the multi-card terminal may report the multi-card problem to the source base station via a measurement report. In an embodiment, the multi-card terminal adds the multi-card problem to the measurement report when the condition for sending the measurement report is met by sending a target RRC signaling to the source base station, and the target RRC message is configured to report the measurement report with the added multi-card problem.

In another possible implementation, the multi-card terminal reports the multi-card problem to the source base station in case it is determined to send the multi-card problem. In an embodiment, the multi-card terminal may report the multi-card problem via a target signaling. The target signaling includes, but is not limited to, any of the RRC signaling, the MAC signaling, and the PHY signaling.

In some embodiments, FIG. 8 is a flowchart illustrating a handling method for a multi-card problem according to an exemplary embodiment of the present disclosure. As shown in FIG. 8, the method may include the following steps 801 to 806.

At step 801, a multi-card terminal sends a multi-card problem in the multi-card terminal to a source base station corresponding to the multi-card terminal.

At step 802, the source base station, in response to determining that the multi-card terminal needs to perform cell handover, sends a handover request signaling to a target base station to which the multi-card terminal is to hand over. Where the handover request signaling includes a multi-card problem in the multi-card terminal.

At step 803, the target base station configures terminal configuration information for the multi-card terminal to solve the multi-card problem.

At step 804, the target base station sends a handover request acknowledge signaling to the source base station, where the handover request acknowledge signaling includes the terminal configuration information.

At step 805, the source base station sends the terminal configuration information to the multi-card terminal. In an embodiment of the present disclosure, the source base station may control the multi-card terminal to perform cell handover (not shown in FIG. 8) based on the handover request acknowledge signaling.

At step 806, the multi-card terminal solves the multi-card problem in the multi-card terminal during or after the cell handover based on the received terminal configuration information.

In the above embodiments, the multi-card problem can be solved for the multi-card terminal during or after the cell handover, with high availability.

Figure 9:
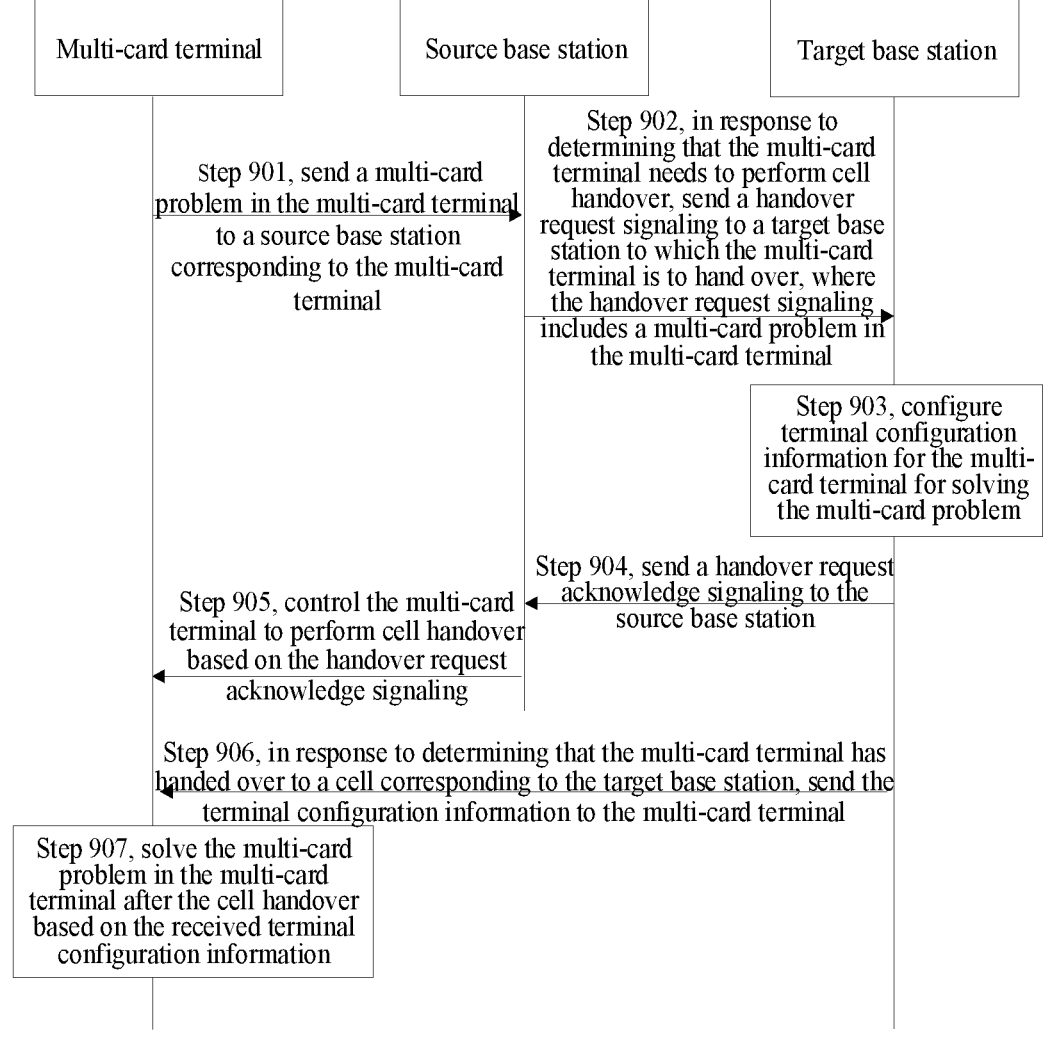
FIG. 9 is a flowchart illustrating a handling method for a multi-card problem according to still another exemplary embodiment of the present disclosure.

In some embodiments, FIG. 9 is a flowchart illustrating a handling method for a multi-card problem according to still an exemplary embodiment of the present disclosure. As shown in FIG. 9, the method may include the following steps 901 to 907.

At step 901, a multi-card terminal sends a multi-card problem in the multi-card terminal to a source base station corresponding to the multi-card terminal.

At step 902, the source base station, in response to determining that the multi-card terminal needs to perform cell handover, sends a handover request signaling to a target base station to which the multi-card terminal is to hand over. Where the handover request signaling includes a multi-card problem in the multi-card terminal.

At step 903, the target base station configures terminal configuration information for the multi-card terminal to solve the multi-card problem.

At step 904, the target base station sends a handover request acknowledgment signaling to the source base station.

At step 905, the source base station controls the multi-card terminal to perform cell handover based on the handover request acknowledge signaling.

At step 906, the target base station, in response to determining that the multi-card terminal has handed over to a cell corresponding to the target base station, sends the terminal configuration information to the multi-card terminal.

At step 907, the multi-card terminal solves the multi-card problem in the multi-card terminal after the cell handover based on the received terminal configuration information.

In the above embodiments, the multi-card problem can be solved for the multi-card terminal after the cell handover, with high availability.

Corresponding to the embodiments of the method for implementing the application function, the present disclosure also provides embodiments of an apparatus for implementing the application function.

Figure 10:
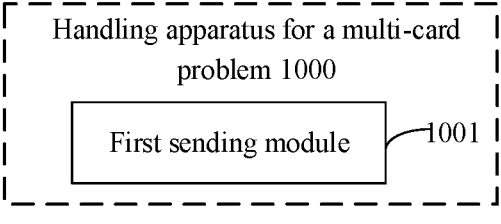
FIG. 10 is a block diagram illustrating a handling apparatus for a multi-card problem according to an exemplary embodiment of the present disclosure.

FIG. 10 is a block diagram illustrating a handling apparatus for a multi-card problem 1000 according to an exemplary embodiment of the present disclosure, and as shown in FIG. 10, the apparatus 1000 can be applied to a source base station, and includes a first sending module 1001.

The first sending module 1001 is configured to, in response to determining that a multi-card terminal needs to perform cell handover, send a handover request signaling to a target base station to which the multi-card terminal is to hand over. The handover request signaling includes a multi-card problem in the multi-card terminal.

Figure 11:
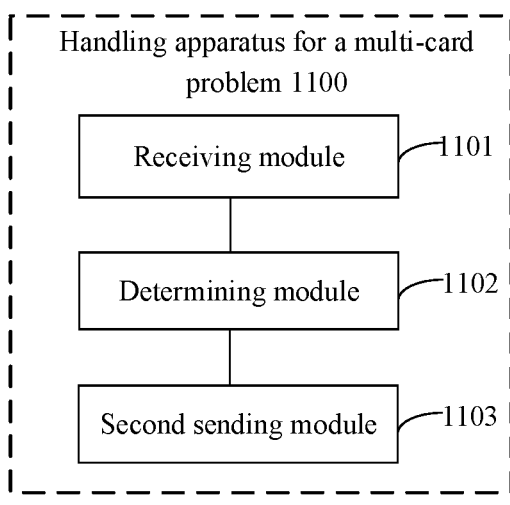
FIG. 11 is a block diagram illustrating a handling apparatus for a multi-card problem according to another exemplary embodiment of the present disclosure.

FIG. 11 is a block diagram illustrating a handling apparatus for a multi-card problem 1100 according to another exemplary embodiment of the present disclosure. As shown in FIG. 11, the apparatus 1100 can be applied to a target base station, and includes a receiving module 1101, a determining module 1102, and a second sending module 1103.

The receiving module 1101 is configured to receive a handover request signaling sent by a source base station corresponding to a multi-card terminal. The handover request signaling includes a multi-card problem in the multi-card terminal.

The determining module 1102 is configured to configure terminal configuration information for the multi-card terminal to solve the multi-card problem.

The second sending module 1103 is configured to send the terminal configuration information.

Figure 12:
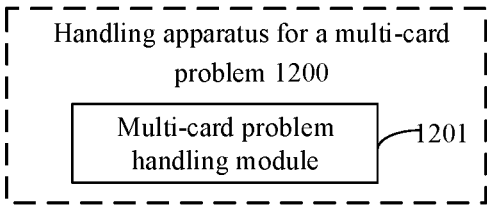
FIG. 12 is a block diagram illustrating a handling apparatus for a multi-card problem according to yet another exemplary embodiment of the present disclosure.

FIG. 12 is a block diagram illustrating a handling apparatus for a multi-card problem 1200 according to yet another exemplary embodiment of the present disclosure. As shown in FIG. 12, the apparatus 1200 can be applied to a multi-card terminal and includes a multi-card problem handling module 1201.

The multi-card problem handling module 1201 is configured to solve, based on received terminal configuration information, a multi-card problem in the multi-card terminal during or after cell handover. The terminal configuration information is configuration information configured for the multi-card terminal for solving the multi-card problem by a target base station to which the multi-card terminal is to hand over.

Since embodiments of the device substantially correspond to embodiments of the method, relevant parts may be referred to the description of the embodiments of the method. The embodiments of the device described above are merely schematic, where the units described as separate components may or may not be physically separate, and the components displayed as units may or may not be physical units, i.e., the components displayed as units may be located in one place or distributed to a plurality of network units. Some or all of these modules can be selected according to actual needs to achieve the purpose of the solution of the present disclosure. It may be understood and implemented by those skilled in the art without creative work.

Correspondingly, the present disclosure further provides a computer-readable storage medium storing computer programs thereon. Where the computer programs, when executed by a processor, cause the processor to perform the handling method for a multi-card problem applied to the base station side.

Correspondingly, the present disclosure further provides a computer-readable storage medium storing computer programs thereon, where the computer programs, when executed by a processor, cause the processor to perform the handling method for a multi-card problem applied to the multi-card terminal side.

Correspondingly, the present disclosure further provides a handling device for a multi-card problem, including: a processor; and a memory storing instructions executable by the processor, where the processor is configured to perform the handling method for a multi-card problem applied to the base station side.

Figure 13:
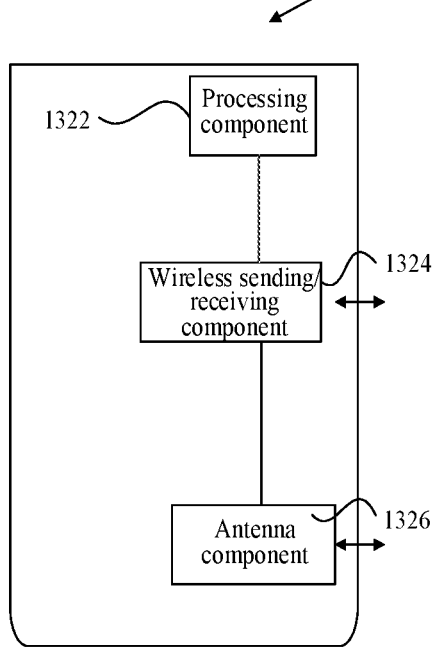
FIG. 13 is a block diagram illustrating a handling device for a multi-card problem according to an exemplary embodiment of the present disclosure.

FIG. 13 is a block diagram illustrating a handling device for a multi-card problem 1300 according to an exemplary embodiment of the present disclosure. The device 1300 may be provided as a base station. As shown in FIG. 13, the device 1300 includes a processing component 1322, a wireless sending/receiving component 1324, an antenna component 1326, and a signal processing portion specific to a wireless interface. The processing component 1222 may further include one or more processors (not shown).

One of the processors in the processing component 1322 may be configured to execute any one of the data transmission methods of the base station.

Correspondingly, the present disclosure further provides a handling device for a multi-card problem, including: a processor; and a memory storing instructions executable by the processor. Where the processor is configured to perform the handling method for a multi-card problem applied to the multi-card terminal side.

Figure 14:
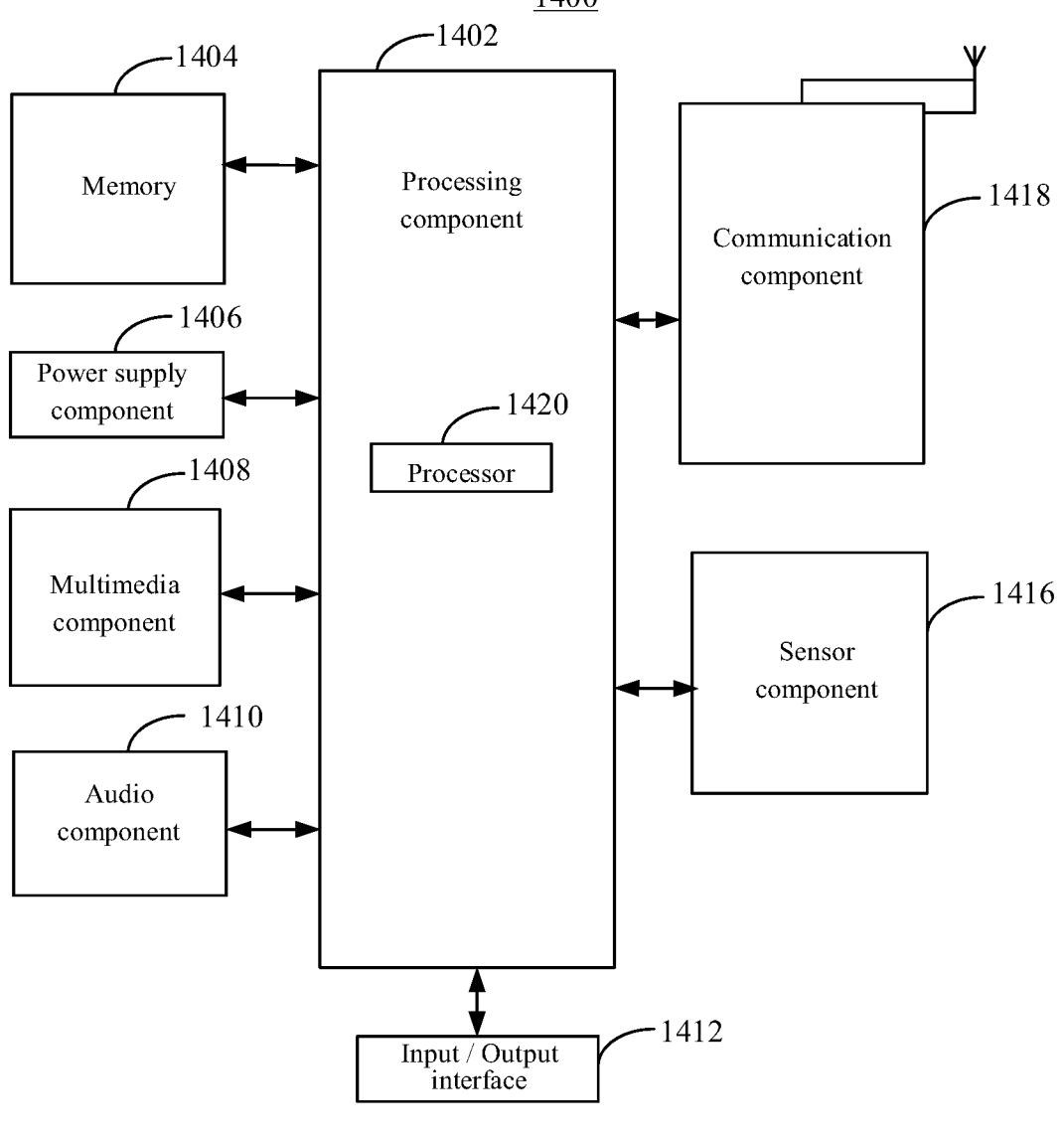
FIG. 14 is a block diagram illustrating a handling device for a multi-card problem according to another exemplary embodiment of the present disclosure.

FIG. 14 is a structural schematic diagram illustrating an electronic device 1400 according to an example of the present disclosure. For example, the electronic device 1400 may be a mobile phone, a tablet computer, an e-book reader, a multimedia player, a wearable device, a vehicle-mounted terminal, an iPad, a smart TV, or other terminal.

As shown in FIG. 14, the electronic device 1400 may include one or more assemblies of a processing component 1402, a memory 1404, a power supply component 1406, a multimedia component 1408, an audio component 1410, an input/output (I/O) interface 1412, a sensor component 1416, and a communication component 1418.

The processing component 1402 generally controls the overall operation of the electronic device 1400, such as operations associated with displays, phone calls, data transmissions, camera operations, and recording operations. The processing component 1402 may include one or more processors 1420 to execute instructions to complete all or a part of the blocks of the above data transmission methods. Further, the processing component 1402 may include one or more modules to facilitate interaction between the processing component 1402 and another component. For example, the processing component 1402 may include a multimedia module to facilitate the interaction between the multimedia component 1408 and the processing component 1402. For another example, the processing component 1402 may read executable instructions from the memory to perform steps in the data transmission method provided in an example as described above.

The memory 1404 is configured to store different types of data to support operation at the electronic device 1400. Examples of such data include instructions, contact data, phonebook data, messages, pictures, videos, and so on for any application or method that operates on the electronic device 1400. The memory 1404 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a disk or a CD.

The power supply component 1406 provides power to different assemblies of the electronic device 1400. The power supply component 1406 may include a power source management system, one or more power sources, and other assemblies associated with generating, managing, and distributing power for the electronic device 1400.

The multimedia component 1408 includes a display screen that provides an output interface between the electronic device 1400 and a user. In some embodiments, the multimedia component 1408 may include a front camera and/or a rear camera. When the electronic device 1400 is in an operating mode, such as in a shooting mode or a video mode, the front camera and/or the rear camera may receive external multimedia data. Each of the front and rear cameras may be a fixed optical lens system or have a focal length and a capability of an optical zoom.

The audio component 1410 is configured to output and/or input an audio signal. For example, the audio component 1410 includes a microphone (MIC). When the electronic device 1400 is in an operating mode, for example, in a call mode, a recording mode, or a speech recognition mode, the microphone is configured to receive an external audio signal. The received audio signal may be further stored in the memory 1404 or sent via the communication component 1418. In some embodiments, the audio component 1410 also includes a speaker for outputting an audio signal.

The I/O interface 1412 may provide an interface between the processing component 1402 and peripheral interface modules. The above peripheral interface modules may include a keyboard, a click wheel, buttons, and so on. Such buttons may include, but are not limited to: a home button, a volume button, a start button, and a lock button.

The sensor component 1416 includes one or more sensors for evaluating states of the electronic device 1400 in different aspects. For example, the sensor component 1416 may detect the on/off status of the electronic device 1400, and the relative positioning of the component, for example, the component is a display and a keypad of the electronic device 1400. The sensor component 1416 may also detect a change in position of the electronic device 1400 or a component of the electronic device 1400, a presence or absence of the contact between a user and the electronic device 1400, an orientation or an acceleration/deceleration of the electronic device 1400, and a change in temperature of the electronic device 1400. The sensor component 1416 may include a proximity sensor configured to detect the presence of a nearby object without any physical contact. The sensor component 1416 may also include an optical sensor, such as a CMOS or CCD image sensor used in an imaging application. In some embodiments, the sensor component 1416 may also include an acceleration sensor, a gyroscope sensor, a magnetic sensor, a pressure sensor, or a temperature sensor.

The communication component 1418 is configured to facilitate wired or wireless data transmission between the electronic device 1400 and other devices. The electronic device 1400 may access a wireless network based on a data transmission standard, such as Wi-Fi, 2G, 3G, 4G, 5G, or 6G, or a combination thereof. In some embodiments, the communication component 1418 may receive a broadcast signal or broadcast-related information from an external broadcast management system via a broadcast channel. In an example, the communication component 1418 may also include a Near Field Communication (NFC) module to facilitate short-range data transmissions. For example, the NFC module may be implemented based on radio frequency identification (RFID) technology, infrared data association (IrDA) technology, ultra-wideband (UWB) technology, Bluetooth (BT) technology, and other technologies.

In some illustrative embodiments, the electronic device 1400 may be implemented by one or more of an application-specific integrated circuit (ASIC), a digital signal processor (DSP), a digital signal processing device (DSPD), programmable logical device (PLD), field programmable gate array (FPGA), a controller, microcontroller, a microprocessor or other electronic components to perform any one of the data transmission methods of the terminal.

In an example embodiment, there is also provided a non-transitory machine-readable storage medium including instructions, such as a memory 1404 including instructions, where the instructions are executable by the processor 1420 of the electronic device 1400 to implement the method of controlling temperature as described above. For example, the non-transitory computer-readable storage medium may be a Read-Only Memory (ROM), a Random Access Memory (RAM), a CD-ROM, a magnetic tape, a floppy disk, and an optical data storage device, etc.

In some embodiments, there is provided a handling method for a multi-card problem, performed by a source base station, and including: determining that a multi-card terminal needs to perform cell handover, sending a handover request signaling to a target base station to which the multi-card terminal is to hand over, where the handover request signaling includes a multi-card problem in the multi-card terminal.

In some embodiments, sending the handover request signaling to the target base station to which the multi-card terminal is to hand over includes: sending the handover request signaling including a target information unit to the target base station, where the target information unit indicating the multi-card problem is added to the handover request signaling; or sending the handover request signaling including a handover preparation information to the target base station, where the multi-card problem is added to the handover preparation information.

In some embodiments, the handover request signaling includes auxiliary information, and the auxiliary information is configured to assist the target base station in solving the multi-card problem.

In some embodiments, the method further includes: receiving a handover request acknowledge signaling returned by the target base station, where the handover request acknowledge signaling includes terminal configuration information configured by the target base station for the multi-card terminal for solving the multi-card problem; and sending the terminal configuration information to the multi-card terminal.

In some embodiments, sending the terminal configuration information to the multi-card terminal includes: sending a wireless resource control reconfiguration signaling includinging the terminal configuration information to the multi-card terminal; or sending a handover command including the terminal configuration information to the multi-card terminal, where the handover command is configured to instruct the multi-card terminal to hand over to a cell corresponding to the target base station.

In some embodiments, the method further includes: receiving the multi-card problem reported by the multi-card terminal, and sending the handover request signaling to the target base station to which the multi-card terminal is to hand over.

In some embodiments, there is provided a handling method for a multi-card problem, performed by a target base station, and including: receiving a handover request signaling sent by a source base station corresponding to a multi-card terminal, where the handover request signaling includes a multi-card problem in the multi-card terminal; configuring terminal configuration information for the multi-card terminal for solving the multi-card problem; and sending the terminal configuration information.

In some embodiments, the handover request signaling includes auxiliary information, and the auxiliary information is configured to assist the target base station in solving the multi-card problem.

In some embodiments, sending the terminal configuration information includes: sending a handover request acknowledge signaling to the source base station, where the handover request acknowledge signaling includes the terminal configuration information.

In some embodiments, sending the terminal configuration information includes: determining that the multi-card terminal has handed over to a cell corresponding to the target base station, and sending the terminal configuration information to the multi-card terminal.

In some embodiments, sending the terminal configuration information to the multi-card terminal includes: sending a wireless resource control reconfiguration signaling including the terminal configuration information to the multi-card terminal; or sending a wireless resource control connection reconfiguration signaling including the terminal configuration information to the multi-card terminal.

In some embodiments, there is provided a handling method for a multi-card problem, performed by a multi-card terminal, and including: solving, based on received terminal configuration information, a multi-card problem in the multi-card terminal during or after cell handover, where the terminal configuration information is configuration information configured for the multi-card terminal for solving the multi-card problem by a target base station to which the multi-card terminal is to hand over.

In some embodiments, the method further includes: receiving the terminal configuration information sent by a source base station corresponding to the multi-card terminal; or receiving the terminal configuration information sent by the target base station.

In some embodiments, the method further includes: sending a multi-card problem in the multi-card terminal to a source base station corresponding to the multi-card terminal.

In some embodiments, sending the multi-card problem in the multi-card terminal to the source base station corresponding to the multi-card terminal includes: sending a target radio resource control (RRC) signaling to the source base station, where the target RRC signaling is configured to report a measurement report into which the multi-card problem is added; or determining that the multi-card problem occurs in the multi-card terminal, sending a target signaling including the multi-card problem to the source base station, where the target signaling includes any one of a target radio resource control (RRC) signaling, a media access control (MAC) signaling, and a physical layer (PHY) signaling.

In some embodiments, there is provided a handling apparatus for a multi-card problem, applied to a source base station, and including: a first sending module, configured to, determine that a multi-card terminal needs to perform cell handover, send a handover request signaling to a target base station to which the multi-card terminal is to hand over, where the handover request signaling includes a multi-card problem in the multi-card terminal.

In some embodiments, there is provided a handling apparatus for a multi-card problem, applied to a target base station, and including: a receiving module, configured to receive a handover request signaling sent by a source base station corresponding to a multi-card terminal, where the handover request signaling includes a multi-card problem in the multi-card terminal; a determining module, configured to configure terminal configuration information for the multi-card terminal for solving the multi-card problem; and a second sending module, configured to send the terminal configuration information.

In some embodiments, there is provided a handling apparatus for a multi-card problem, applied to a multi-card terminal, and including: a multi-card problem handling module, configured to solve, based on received terminal configuration information, a multi-card problem in the multi-card terminal during or after cell handover, where the terminal configuration information is configuration information configured for the multi-card terminal for solving the multi-card problem by a target base station to which the multi-card terminal is to hand over.

In some embodiments, there is provided a non-transitory computer-readable storage medium, storing computer programs thereon, where the computer programs, when executed by a processor, cause the processor to perform the method of the first aspect or second aspect.

In some embodiments, there is provided a non-transitory computer-readable storage medium, storing computer programs thereon, where the computer programs, when executed by a processor, cause the processor to perform the method of the third aspect.

In some embodiments, there is provided a handling device for a multi-card problem, including: a processor; and a memory storing instructions executable by the processor, where the processor is configured to perform the method of the first aspect or second aspect.

In some embodiments, there is provided a handling device for a multi-card problem, including: a processor; and a memory storing instructions executable by the processor, where the processor is configured to perform the method of the third aspect.

Embodiments of the present disclosure provide technical solutions that may include the following beneficial effects.

In the embodiments of the present disclosure, when the source base station corresponding to the multi-card terminal determines that the multi-card terminal needs to perform cell handover, the source base station may send the handover request signaling to the target base station to which the multi-card terminal is to hand over, where the handover request signaling includes a multi-card problem in the multi-card terminal. The target base station may configure the terminal configuration information for the multi-card terminal to solve the multi-card problem, and send the terminal configuration information. Based on the received terminal configuration information, the multi-card terminal solves the multi-card problem during or after cell handover. The present disclosure may solve the multi-card problem for the multi-card terminal during or after cell handover.

After considering the specification and practicing the present disclosure, a person skilled in the art would easily conceive of other implementations of the present disclosure. The present disclosure is intended to cover any variations, uses, modification or adaptations of the present disclosure that follow the general principles thereof and include common knowledge or conventional technical means in the related art that are not disclosed in the present disclosure. The specification and examples are considered exemplary only, with a true scope and spirit of the present disclosure being indicated by the following claims.

It is to be understood that the present disclosure is not limited to the precise construction described herein and shown in the drawings, and that various modifications and changes may be made without departing from the scope thereof. The scope of the disclosure is to be limited only by the appended claims.

The invention claimed is:

1. A handling method for a multi-card problem, performed by a source base station, and comprising:
   determining that a multi-card terminal needs to perform cell handover; and
   sending a handover request signaling to a target base station to which the multi-card terminal is to hand over, wherein the handover request signaling comprises a multi-card problem in the multi-card terminal, wherein the multi-card problem in the multi-card terminal refers to a problem which occurs in the multi-card terminal and affects at least one network system when the multi-card terminal handles services of different network systems corresponding to multiple SIM cards;
   wherein the handover request signaling comprises auxiliary information, the auxiliary information is configured to assist the target base station in solving the multi-card problem, and the auxiliary information comprises at least one of: a random access preamble code when the multi-card terminal initiates a random access, a wireless network temporary identification of a SIM card with paging collisions in the multi-card terminal, or an expected time duration to leave a first system configured for the multi-card terminal by a network side.

2. The method of claim 1, wherein sending the handover request signaling to the target base station to which the multi-card terminal is to hand over comprises at least one of:
   sending the handover request signaling comprising a target information unit to the target base station, wherein the target information unit indicating the multi-card problem is added to the handover request signaling; or
   sending the handover request signaling comprising a handover preparation information to the target base station, wherein the multi-card problem is added to the handover preparation information.

3. The method of claim 1, further comprising:
   receiving a handover request acknowledge signaling returned by the target base station, wherein the handover request acknowledge signaling comprises terminal configuration information configured by the target base station for the multi-card terminal for solving the multi-card problem; and
   sending the terminal configuration information to the multi-card terminal.

4. The method of claim 3, wherein sending the terminal configuration information to the multi-card terminal comprises:

sending a wireless resource control reconfiguration signaling comprising the terminal configuration information to the multi-card terminal; or sending a handover command comprising the terminal configuration information to the multi-card terminal, wherein the handover command is configured to instruct the multi-card terminal to hand over to a cell corresponding to the target base station.

5. The method of claim 1, further comprising:

receiving the multi-card problem reported by the multi-card terminal, and sending the handover request signaling to the target base station to which the multi-card terminal is to hand over.

6. A handling device for a multi-card problem, comprising:

a processor; and a memory storing instructions executable by the processor, wherein the processor is configured to perform the method of claim 1.

7. A non-transitory computer readable storage medium, storing computer programs thereon, wherein the computer programs, when executed by a processor, cause the processor to perform the method of claim 1.

8. A handling method for a multi-card problem, performed by a target base station, and comprising:

receiving a handover request signaling sent by a source base station corresponding to a multi-card terminal, wherein the handover request signaling comprises a multi-card problem in the multi-card terminal;

configuring terminal configuration information for the multi-card terminal for solving the multi-card problem; and sending the terminal configuration information;

wherein the multi-card problem in the multi-card terminal refers to a problem which occurs in the multi-card terminal and affects at least one network system when the multi-card terminal handles services of different network systems corresponding to multiple SIM cards;

wherein the handover request signaling comprises auxiliary information, the auxiliary information is configured to assist the target base station in solving the multi-card problem, and the auxiliary information comprises at least one of: a random access preamble code when the multi-card terminal initiates a random access, a wireless network temporary identification of a SIM card with paging collisions in the multi-card terminal, or an expected time duration to leave a first system configured for the multi-card terminal by a network side.

9. The method of claim 8, wherein sending the terminal configuration information comprises:

sending a handover request acknowledge signaling to the source base station, wherein the handover request acknowledge signaling comprises the terminal configuration information.

10. The method of claim 8, wherein sending the terminal configuration information comprises:

determining that the multi-card terminal has handed over to a cell corresponding to the target base station; and sending the terminal configuration information to the multi-card terminal.

11. The method of claim 10, wherein sending the terminal configuration information to the multi-card terminal comprises:

sending a wireless resource control reconfiguration signaling comprising the terminal configuration information to the multi-card terminal; or sending a wireless resource control connection reconfiguration signaling comprising the terminal configuration information to the multi-card terminal.

12. A non-transitory computer readable storage medium, storing computer programs thereon, wherein the computer programs, when executed by a processor, cause the processor to perform the method of claim 8.

13. A handling device for a multi-card problem, comprising:

a processor; and a memory storing instructions executable by the processor, wherein the processor is configured to perform the method of claim 8.

14. A handling method for a multi-card problem, performed by a multi-card terminal, and comprising:

solving, based on received terminal configuration information, a multi-card problem in the multi-card terminal during or after cell handover, wherein the terminal configuration information is configuration information configured for the multi-card terminal for solving the multi-card problem by a target base station to which the multi-card terminal is to hand over;

wherein the multi-card problem in the multi-card terminal refers to a problem which occurs in the multi-card terminal and affects at least one network system when the multi-card terminal handles services of different network systems corresponding to multiple SIM cards;

wherein a handover request signaling sent from a source base station of the multi-card terminal to the target base station comprises auxiliary information, the auxiliary information is configured to assist the target base station in solving the multi-card problem, and the auxiliary information comprises at least one of: a random access preamble code when the multi-card terminal initiates a random access, a wireless network temporary identification of a SIM card with paging collisions in the multi-card terminal, or an expected time duration to leave a first system configured for the multi-card terminal by a network side.

15. The method of claim 14, further comprising:

receiving the terminal configuration information sent by a source base station corresponding to the multi-card terminal; or receiving the terminal configuration information sent by the target base station.

16. The method of claim 14, further comprises:

sending a multi-card problem in the multi-card terminal to a source base station corresponding to the multi-card terminal.

17. The method of claim 16, wherein sending the multi-card problem in the multi-card terminal to the source base station corresponding to the multi-card terminal comprises at least one of:

sending a target radio resource control (RRC) signaling to the source base station, wherein the target RRC signaling is configured to report a measurement report into which the multi-card problem is added; or determining that the multi-card problem occurs in the multi-card terminal, and sending a target signaling comprising the multi-card problem to the source base station, wherein the target signaling comprises any one of a target radio resource control (RRC) signaling, a media access control (MAC) signaling, and a physical layer signaling.

18. A non-transitory computer readable storage medium, storing computer programs thereon, wherein the computer programs, when executed by a processor, cause the processor to perform the method of claim 14.

19. A handling device for a multi-card problem, comprising:

a processor; and a memory storing instructions executable by the processor, wherein the processor is configured to perform the method of claim 14.

\* \* \* \* \*